United States Patent [19]
Bontrager

[11] 3,959,958
[45] June 1, 1976

[54] DEFLECTOR ROLLER APPARATUS

[76] Inventor: Jacob Bontrager, 809 3rd Ave. N.E., Jamestown, N. Dak. 58401

[22] Filed: Apr. 9, 1975

[21] Appl. No.: 566,265

[52] U.S. Cl. .................................................. 56/314
[51] Int. Cl.² ......................................... A01D 63/02
[58] Field of Search ............................. 56/314–320, 56/119, 126–130, 330

[56] References Cited
UNITED STATES PATENTS
3,844,094   10/1974   Janzen ............................ 56/314 X FOREIGN PATENTS OR APPLICATIONS
257,962   7/1947   Switzerland........................... 56/314

Primary Examiner—Louis G. Mancene
Assistant Examiner—J. N. Eskovitz
Attorney, Agent, or Firm—Robert E. Kleve

[57] ABSTRACT

The invention comprises a roller deflection apparatus. One of each apparatus is mounted to each part of the dividers of a header. Each apparatus has a main plate attachment which is attached to the underside of each point of the dividers of the header. A slidable elongated rod is slidably mounted in said main plate and extends forward in length. The main plate has a spring urging said rod to a central forward position and a roller is rotatably mounted to a forward lateral upwardly bent end of the rod to rotate about a horizontal axis and projects upward in front of the points of the dividers. The rod is slidable rearwardly. The rod is not pivotable to either side of its central forward position but is pivotable to either side in a progressively wider diverging path as said rod is slid rearward from its central forward position, with said spring urging said rod back to its central forward positions.

5 Claims, 5 Drawing Figures

DEFLECTOR ROLLER APPARATUS

This invention relates to farm equipment, more particularly, the invention relates to equipment for cutting and harvesting.

It is an object of the invention to provide a novel spring biased roller mechanisms which are mounted to the points at the front of the pan type dividers of a sunflower seed header. The rollers are spring biased to a forward central position and are retractable rearward to cushion the engagement of the stems of the plants of sunflower seeds with the front end of the dividers to prevent the stems of the plants from being broken over or the heads of the plants from snapping off as the header moves through a field of planted sunflower plants to cut and reel the plants into a harvesting mechanism.

It is another object of the invention to provide a novel spring biased roller to be mounted to the front of the dividers of a header to cushion the engagement of the dividers with the stems of plants when the header is moved through a field of plants to cut and harvest the plants.

It is another object of the invention to provide spring biased rollers mounted to the fronts of the points of a sunflower seed header to deflect and cushion the engagement of the stems of the sunflower seed plants as the header travels through a field of the plants to cut the stems and reel in the plants and harvest the heads of the plants, with the deflection cushioning roller cushioning against a sudden sharp engagement of the points of the header with the stems of the plants.

Further objects and advantages of the invention will become apparent as the description proceeds and when taken in conjunction with the accompanying drawing wherein.

Briefly stated, the invention comprises a spring biased roller point mechanism for attachment to the points of the dividers of a cutting and reeling header for cutting and reeling and harvesting sunflower seeds, said spring biased rollers having a forward central position retractable rearwardly under engagement with the stem of the sun flower seed plant and also gradually movable further to either side while moving rearwardly to deflect and cushion the frontal and side engagement of the stems with the front ends of the dividers to prevent the points of the dividers from breading the stems of the plant so as to cause the plants to break down in the ground and pass under the header, and to prevent the snapping off of the heads of the sunflower seed plants before the plants can be received into the header for harvesting.

Figure 1:
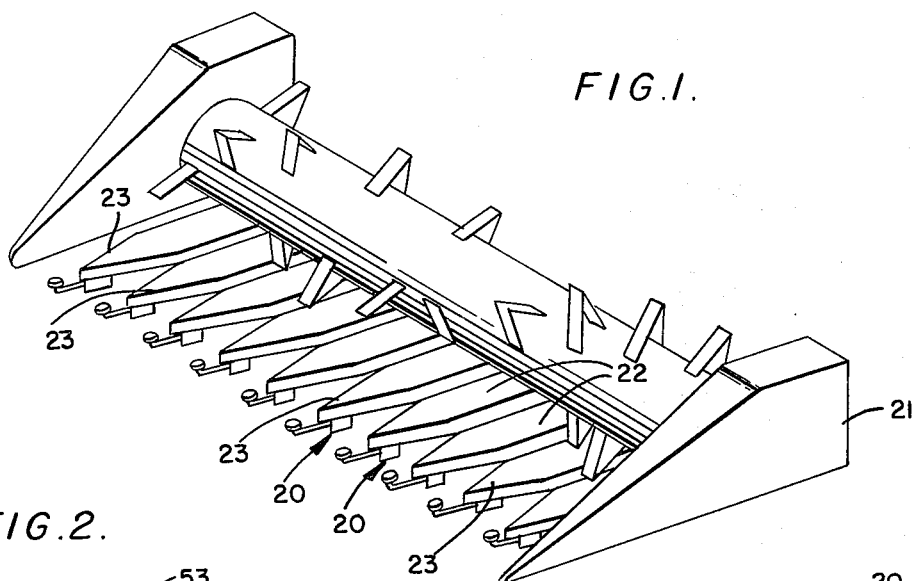
FIG. 1 is a perspective view of the sunflower seed header with the spring biased roller apparatus mounted on the points of the dividers of the header.

Referring more particularly to the drawing, in FIG. 1 the roller deflector attachment invention 20 is illustrated as being attached to the sunflower seed header 21 by attachment to the dividers 22 at the underside of the front pointed ends 23 of each divider.

The deflector attachment invention 20 has a triangular shaped main plate 24, formed of a triangular shaped top panel 25 and a pair of depending flanges 26 and 27, depending downward from the top plate 25 on each side of the plate 25 and formed integrally with the top plate 25. A nut 28 is welded to the underside of the main top plate 25.

The main plate 24 is secured to the underside of the divider by the bolts 22' passing through bores in the main plate and divider and nuts threaded onto the bolts. A bolt 22'' is welded onto the main plate 24 and projects through a bore in the divider and a nut is threaded onto the bolt to hold plate 24 and divider together.

A steel rod 29 has its rearward end 29' slidably mounted in the nut 28. The forward portion of the rod projects forward out of the open mouth 30 of the main plate 24 and the rod 29 has an upwardly bent forward end 31. A steel roller is rotatably mounted on the upwardly bent portion 31, by an enlarged shoulder on the rod below the roller 32, a nut 33 threaded onto the top of the end rod above the roller.

The straight longitudinal portion 34 of the rod 29 has a pair of laterally projecting short rod portions 35 and 36 fixed to the longitudinal portion of the rod and projecting outward in opposite directions.

The main plate 24 has a pair of vertical ridges 37 and 38 fixed along the inside wall of the side flanges 26 and 27 and a rod brace member 39 fixed across between the side flanges 26 and 27 at the bottom of the ridges 37 and 38.

The rod member has a bore 40 therethrough spaced between the lateral legs 35 and 36 and the nut member or sleeve 28 and a cotter key 41 is fitted in the bore. A coil spring 42 is mounted on the rod 29 and is under compression between the cotter key and nut member and urges the cotter key forward, thereby urging the rod 29 forward urging the lateral legs 35 and 36 forward against the ridges 37 and 38.

The brace member 37 is spaced below the rod 29 and confines the rod member between the ridges 35 and 36.

Figure 2:
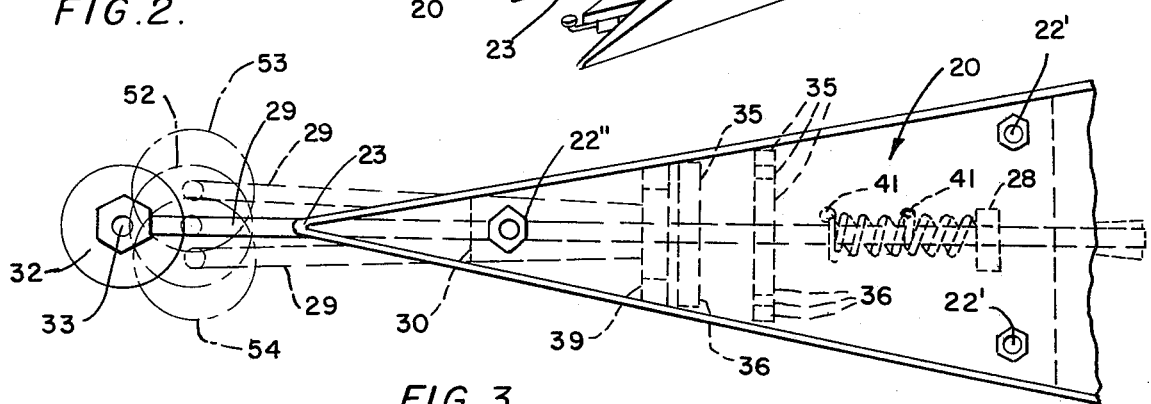
FIG. 2 is a side elevational view of one of the spring biased roller apparatus mounted to one of the dividers with a fragmentary showing on one of the dividers.
Figure 3:
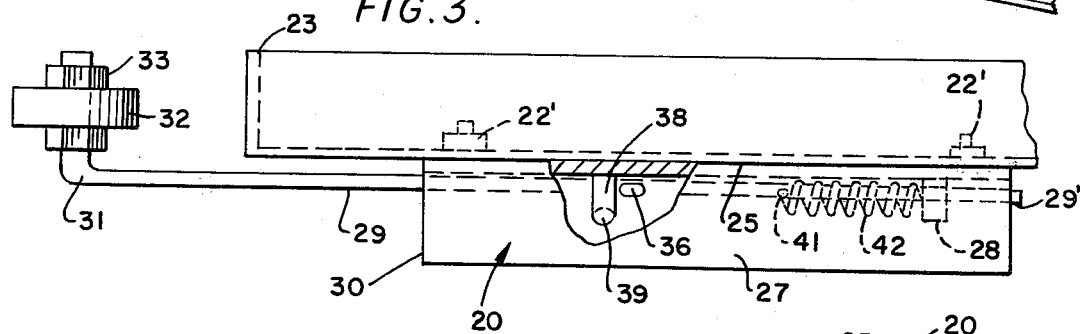
FIG. 3 is a fragmentary top plan view of one of the points of the divider with the spring biased roller point mechanism mounted underneath.
Figure 4:
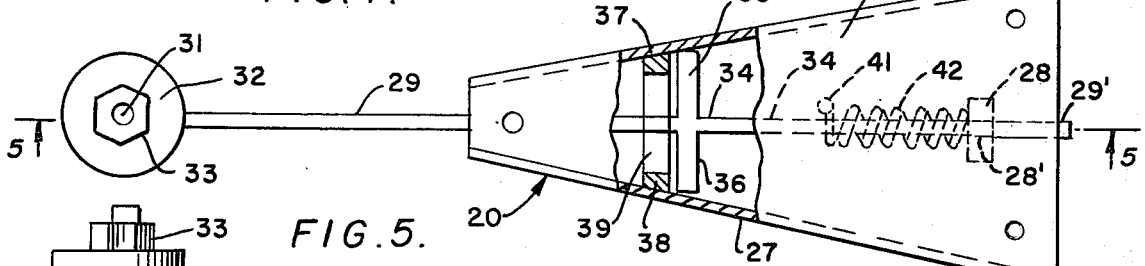
FIG. 4 is a top plan view of the spring biased roller mechanism.
Figure 5:
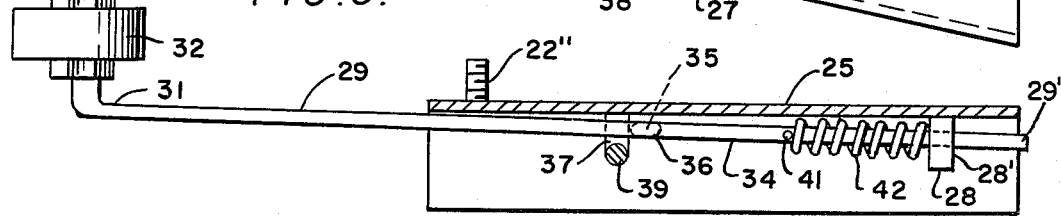
FIG. 5 is a cross-sectional view of the roller apparatus mechanism taken along line 5—5 of FIG. 4.

The rod member 29 is depressable from left to right when viewed from FIGS. 2 and 3. The lateral legs 35 and 36 prevent the rod from rotating by their sliding engagement with the undersurface of the top plate and thereby cause the rod 29 to move in a non rotating manner when sliding left to right and back.

The side flanges 35 and 36 diverge outwardly away from one another from front to rear with the width a distance between the side flanges 26 and 27, at the forward end of the plate, immediately behind the vertical ridges 37 and 38 being only slightly further apart than the distance between the outer ends of the lateral rods of the rod 29 so that when no rearward force is being applied against the roller, or the spring pistons the rod 29 to its forward position the ends of the lateral rods will cam and engage the side flanges to align the rod back into its central forward position, illustrated in solid lines in FIGS. 2 and 3, with the rod 29 parallel and extending longitudinally along the length of the plate of the center of the plate.

The forward limit of movement of the roller and rod is illustrated in solid lines in FIGS. 2 and 3 when the rod is in this forward position it is not free to pivot to either side.

However, when the roller engages an object causing a rearward force reaction as the rod is pushed backward from its forward position shown in FIG. 2, it also becomes free to pivot to either side to an ever increasing extent limited by the lateral rods engaging the side flanges since the distance between the side flanges 26 and 27 at rearward intervals is progressively greater than the distance between the outer ends of the legs. At or near the rearward end of the stroke, the rod may also be engaging the side flanges at the front of the plate to limit its side to side movement.

The thickness of the spring limits the rearward movement of the rod, whether the rod has moved rearward along at a straight line or at an angle to the right or to the left, with the rearward limit of the rod and roller along a straight line, illustrated by numeral 52, and the rearward limit of the rod and roller at an angle to the left illustrated by numeral 53, and the rearward limit of the rod and roller at an angle to the right illustrated by numeral 54.

The spring will be fully compressed when the roller is either at position 52, 53, and 54 which stops the roller short of engagement with the point of the divider.

Thus, the roller is prevented from engaging the points of the divider whether it moves back in a straight line at an angle to one side or the other in either direction by the fact that the spring becomes fully compressed before the roller can engage the point which stops the rearward movement of the rod and its roller.

Also, the roller and rod can pivot to either side to the limit of the space between the side flanges, and while the distance becomes greater as the rod is moved rearward and consequently the roller can pivot gradually further to each side at an ever increasing lateral distance, as the rod moves rearward, the roller can not pivot to either side so that the point of the divider is not protected, and consequently, if a stem of a plant engages and pushes the roller rearward, and to one side or the other, it cannot push the roller to one side or the other to such an extent that the stem could engage the point. Thus, the roller protects the point regardless of its position.

As the rod 29 moves forward or rearward and/or pivots to either side, the rearward end 29' of the rod is sliding in the bore 28' of the nut 28.

It is customary to plant sunflower seed plants with various different spacing between the rows depending upon the particular spacing of the plants employed. However, since the spacing varies when harvesting time comes, the spacing between the dividers or pans of the particular sunflower seed harvester employed may not align with the spacing of the plants in the particular field being harvested. As a result in many instances many of the points of the dividers of the header may be continually engaging the stems of the sunflower seed plants, as the header travels through the field cutting the stems of the sunflower seed plants and reeling them into the harvesting mechanism at the back of the header.

As a result, when the header moves through the field of sunflower seed plants, the points 21 of the header are time and time again engaging the stems of the sunflower seed plants with sharp blows causing the stems to break off so that the entire plant falls to the ground in front of the header and may travel pass under the header, or the sudden impact of the points may cause the heads of the plants carrying the sunflower seeds to snap off and fall to the ground in front of the header and pass beneath the header. In these instances the heads of the sunflower seed plants are not picked up by the header and harvested.

By means of the deflector roller mechanism invention 20 being mounted to the underside of the points of the divider of the sunflower seed header in the manner described, as the header moves the roller 23 initially engaging the stem of the plant roller through the points of the dividers. The roller 23 can rotate or roll in either direction, clockwise or counterclockwise, so that the stem of the plant tends to roll about and past the roller on one side or the other of the divider without breaking the stem or snapping the heads off of the plant, so that a stem may move easily into the slots between the dividers until it reaches the cutter bar at the back of the dividers and reaches the reel which reaches the reel of the header so that the reel can reel the plant against the cutter bar with the stem unbroken and the heads of the plants still on the plants, so that the plants with the heads thereon can be reeled into the harvesting mechanism thereafter with the heads still on the plants.

Since the rod 29 to which the roller is attached can slide rearwardly or at an angle rearwardly to one side, or at an angle rearwardly to the other side, the sharp engagement of the stem against the roller will push the roller and rod rearwardly or at an angle rearwardly to one side or another depending upon the angle of engagement of compressing the spring and act to absorb the blow, thus allowing some give or cushioning action to the engagement.

When initially the stem engages the roller and pushes the rod rearwardly, the rod at the very beginning of the retraction can pivot very little to one side or the other but as the rods slide further back the rod can also pivot more and more to one side or the other moving or yielding in a general direction of the force of engagement, since as the roller moves rearwardly it becomes free to swing within the rod to one side or the other with the rod pivoting about the axis sleeve 28 and with the lateral legs engaging one side or the other of the main plate. This movement to the one side gives more clearance for the stem to pass by the point from the other side of the divider, thus making it easier for the stem to pass to one side or the other of the point of the divider.

This rearward and side to side spring cushioning action tends to cushion the engagement of the roller with the stems so as not to brush the stems with a sudden blunt blow of the point and makes it easier for the stem to flex to one side or the other by enabling the stem to roll off the roller without having to flex to one side to the full width of the roller because of the laterally yielding pivoting action of the rod.

The yielding movement to one side or the other of the rod and roller enables the mechanism to employ a relatively wide roller, so that the stem of the plant can initially engage a relatively wide roller for better rolling deflecting action than if a small roller were employed.

The roller mechanism 20 has been found very effective in actual practice in reducing and minimizing the breaking off and snapping off the stem and head of the plant as has occurred in the past when the rigid point of the dividers or pans have engaged the stem.

Thus, it will be seen that a novel roller mechanism has been provided which is very effective in cushioning the engagement of the stem of the plant with the front end of the dividers and in more gently flexing guiding the stem into the space between the dividers so that the stem can reach the cutter bar and reel of the header before breaking off and before the head of the plant breaks off from the stem.

It will be obvious that various changes and departures may be made to the invention without departing from the spirit thereof and accordingly it is not intended that the invention be limited to that specifically described in the specification or as illustrated in the drawing but only as set forth in the appended claims wherein:

I claim:

1. A roller deflector apparatus adapted to be mounted to each forward point of a divider of a header, said apparatus comprising a horizontal main plate adapted to be mounted to the point of the divider, a pair of side flanges extending vertically from opposite lateral side edges of the main plate, a slidable rod, means for slidably and pivotally mounting said rod to said main plate for permitting forward and rearward sliding and sideward pivoting when sliding rearward, spring means urging said rod to a forward position, said rod having a vertically extending forward end with roller means mounted thereon so as to be positioned in front of the point of the divider in spaced relation, whereby the header may be driven through a field of sunflower plants with the roller means engaging the stems of the sunflower seed plants as the stems approach engagement with the points, and with the roller means movable rearward and to one side with rod upon engagement with the roller and to prevent the stem from engaging the point of the divider and to facilitate guiding the stem by the point along the side of the divider without abruptly engaging the stem.

2. A roller deflector apparatus adapted to be mounted to each forward point of a divider of a header, said apparatus comprising a main plate to be mounted to the point of the divider, a movable rod, movable mounting means for movably mounting said rod to said main plate for permitting movement of said rod with respect to said main plate, spring means returning said rod to its position prior to its movement, said rod having an upwardly extending forward end with a roller rotatably mounted thereon so as to be positioned in front of the point of the divider in spaced relation whereby the header may be driven through a field of sunflower plants to cut and reel the plants with the roller engaging the stems of the sunflower plants as the stems approach engagement with the points, and with the roller movable upon engagement with the stem to cushion the engagement with the roller and to prevent the stem from engaging the point of the divider and to facilitate guiding the stem by the point along the side of the divider without abruptly engaging the stem.

3. A roller deflector apparatus according to claim 2 wherein said mounting means includes means for slidably mounting the rod on the main plate which permits a rearward sliding movement of said rod with respect to said plate and said spring means urges said rod back to a forward position.

4. A roller deflector apparatus according to claim 2 wherein said mounting means includes means for pivotally mounting said rod to said main plate which permits a sideward pivoting of said rod with respect to said plate and said spring means urges said rod back to its original position.

5. A roller deflector apparatus according to claim 2 wherein said mounting means includes means for rearward slidably and pivotally mounting said rod to said main plate which permits rearward sliding and a sideward pivoting of said rod while sliding rearward with respect to said plate, and said spring means urges said rod back to its forward position.

* * * * *